United States Patent
Axmon et al.

(10) Patent No.: US 9,848,362 B2
(45) Date of Patent: Dec. 19, 2017

(54) RADIO CELL ARRANGEMENT IN HIGH SPEED SCENARIO

(71) Applicant: Telefonaktiebolaget L M Ericsson (publ), Stockholm (SE)

(72) Inventors: Joakim Axmon, Kavlinge (SE); Peter Alriksson, Horby (SE); Christopher Callender, Kinross (GB); Maomao Chen, Lund (SE); Torgny Palenius, Barseback (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 19 days.

(21) Appl. No.: 14/421,824

(22) PCT Filed: Jan. 30, 2015

(86) PCT No.: PCT/EP2015/051903
§ 371 (c)(1),
(2) Date: Feb. 14, 2015

(87) PCT Pub. No.: WO2016/119873
PCT Pub. Date: Aug. 4, 2016

(65) Prior Publication Data
US 2016/0345221 A1    Nov. 24, 2016

(51) Int. Cl.
*H04W 36/00* (2009.01)
*H04W 36/04* (2009.01)
(Continued)

(52) U.S. Cl.
CPC ........... *H04W 36/04* (2013.01); *H04W 24/10* (2013.01); *H04W 36/0005* (2013.01);
(Continued)

(58) Field of Classification Search
None
See application file for complete search history.

(56) References Cited

U.S. PATENT DOCUMENTS 8,675,788 B2    3/2014    Andgart et al.
8,892,103 B2    11/2014   Axmon et al.
(Continued)

FOREIGN PATENT DOCUMENTS

EP    1643790 A2    4/2006
EP    2242312 A1    10/2010
(Continued)

OTHER PUBLICATIONS

3GPP TR 36.819, V11.1.0 "Coordinated multi-point operation for LTE physical layer aspects (Release 11)" Dec. 2011, pp. 1-69.
(Continued)

*Primary Examiner* — Erika Washington
(74) *Attorney, Agent, or Firm* — Leffler Intellectual Property Law, PLLC

(57) ABSTRACT

Antenna nodes are controlled to maintain a respective radio cell, each cell having one and the same physical cell identity. The antenna nodes are further controlled to maintain the respective radio cell in a single direction substantially along a path such that each wireless communication device, during movement in a movement direction along the path, can connect either to consecutive antenna nodes towards which the wireless communication device is moving or connect to consecutive antenna nodes away from which the wireless communication device is moving.

19 Claims, 12 Drawing Sheets

(51) Int. Cl.
*H04W 36/32* (2009.01)
*H04W 56/00* (2009.01)
*H04W 24/10* (2009.01)
*H04W 36/16* (2009.01)
*H04W 36/30* (2009.01)
*H04W 88/08* (2009.01)

(52) U.S. Cl.
CPC ..... *H04W 36/0083* (2013.01); *H04W 36/165* (2013.01); *H04W 36/30* (2013.01); *H04W 36/32* (2013.01); *H04W 56/0015* (2013.01); *H04W 88/085* (2013.01)

(56) References Cited

U.S. PATENT DOCUMENTS

| | | | |
|---|---|---|---|
| 2012/0093128 | A1 | 4/2012 | Song et al. |
| 2012/0270594 | A1* | 10/2012 | Parkvall ............ H04W 56/0035 455/524 |
| 2013/0244569 | A1 | 9/2013 | Dunn et al. |
| 2014/0045494 | A1 | 2/2014 | Pekonen et al. |
| 2015/0031364 | A1* | 1/2015 | Chen ................. H04W 36/0027 455/436 |
| 2015/0043369 | A1 | 2/2015 | Kim et al. |
| 2015/0079991 | A1 | 3/2015 | Koskinen et al. |
| 2015/0133121 | A1 | 5/2015 | Li et al. |
| 2015/0215830 | A1 | 7/2015 | Dalsgaard et al. |

FOREIGN PATENT DOCUMENTS

| | | | |
|---|---|---|---|
| EP | 2448329 | A1 | 5/2012 |
| EP | 2819471 | A1 | 12/2014 |
| WO | 2012112098 | A1 | 8/2012 |
| WO | 2013038052 | A1 | 3/2013 |
| WO | 2013114155 | A1 | 8/2013 |
| WO | 2013141544 | A1 | 9/2013 |
| WO | 2013177778 | A1 | 12/2013 |
| WO | 2014089051 | A1 | 6/2014 |
| WO | 2014161576 | A1 | 10/2014 |
| WO | 2016055095 | A1 | 4/2016 |

OTHER PUBLICATIONS

3GPP TS 36.331, V11.9.0 "Evolved Universal Terrestrial Radio Access (E-UTRA); Radio Resource Control (RRC); Protocol Specification (Release 11)", Sep. 2014, pp. 1-356.
3GPP TS 36.321, V11.5.0 "Evolved Universal Terrestrial Radio Access (E-UTRA); Medium Access Control (MAC) protocol specification (Release 11)", Mar. 2014, pp. 1-57.
3GPP TS 36.133, V11.10.0 "Evolved Universal Terrestrial Radio Access (E-UTRA); Requirements for support of radio resource management (Release 11)", Sep. 2014, Part 1 of 2, pp. 1-348.
3GPP TS 36.133, V11.10.0 "Evolved Universal Terrestrial Radio Access (E-UTRA); Requirements for support of radio resource management (Release 11)", Sep. 2014, Part 2 of 2, pp. 349-800.
3GPP TS 36.104, V11.11.0 "Evolved Universal Terrestrial Radio Access (E-UTRA); Base Station (BS) radio transmission and reception (Release 11)", Dec. 2014, pp. 1-136.
NTT DOCOMO, Inc. et al. "Motivation of New SI proposal: Performance enhancements for high speed scenario" 3GPP TSG RAN Meeting #66, Maui, Hawaii, Dec. 8-12, 2014, RP-141849, pp. 1-4.
NTT DOCOMO, Inc. et al. "LTE performance enhancement under high speed scenario" 3GPP TSG RAN Meeting #66, Maui, Hawaii, Dec. 8-12, 2014, RP-142307, pp. 1-7.
Non-Final Office Action issued Nov. 3, 2016 in connection with copending U.S. Appl. No. 14/421,825, all pages.
PCT International Search Report, dated Dec. 3, 2015, in connection with International Application No. PCT/EP2015/051903, all pages.
PCT Written Opinion, dated Dec. 3, 2015, in connection with International Application No. PCT/EP2015/051903, all pages.
PCT International Search Report, dated Oct. 20, 2015, in connection with International Application No. PCT/EP2015/051931, all pages.
PCT Written Opinion, dated Oct. 20, 2015, in connection with International Application No. PCT/EP2015/051931, all pages.

* cited by examiner

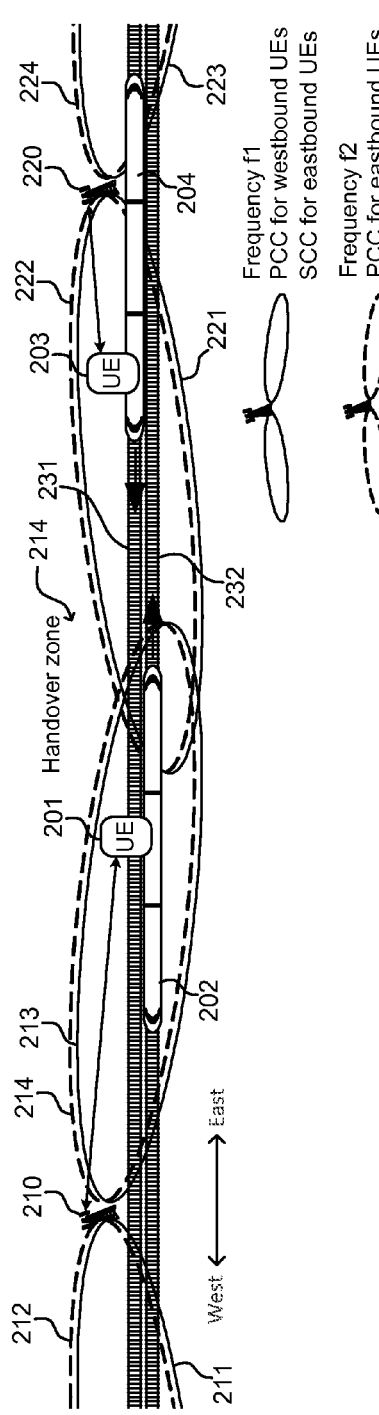
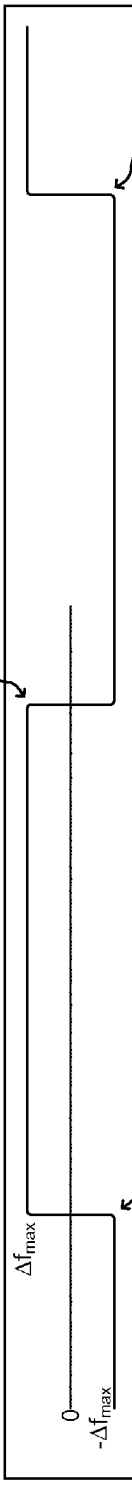
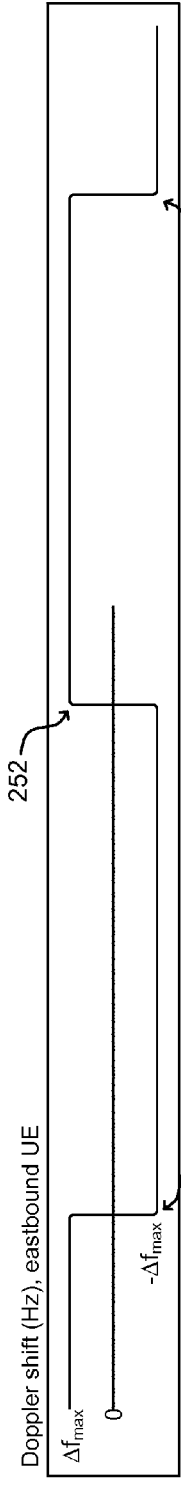
Fig. 2a
Fig. 2b
Fig. 2c

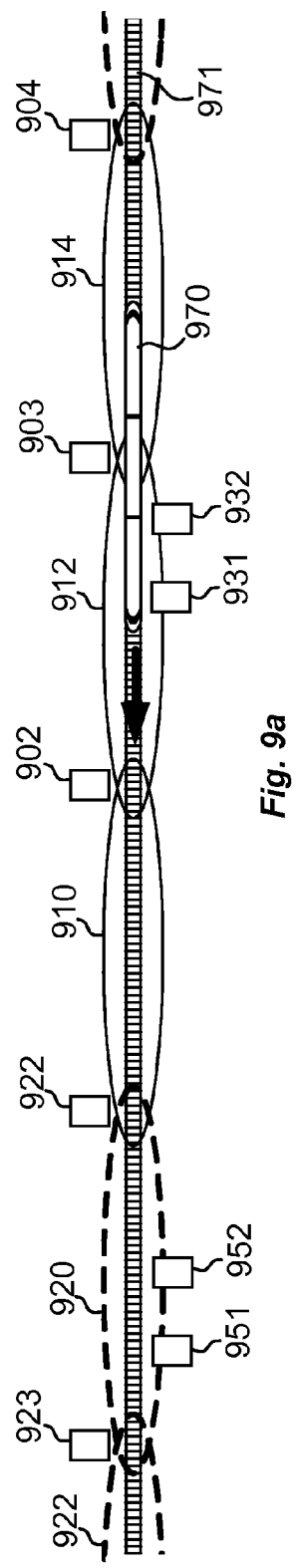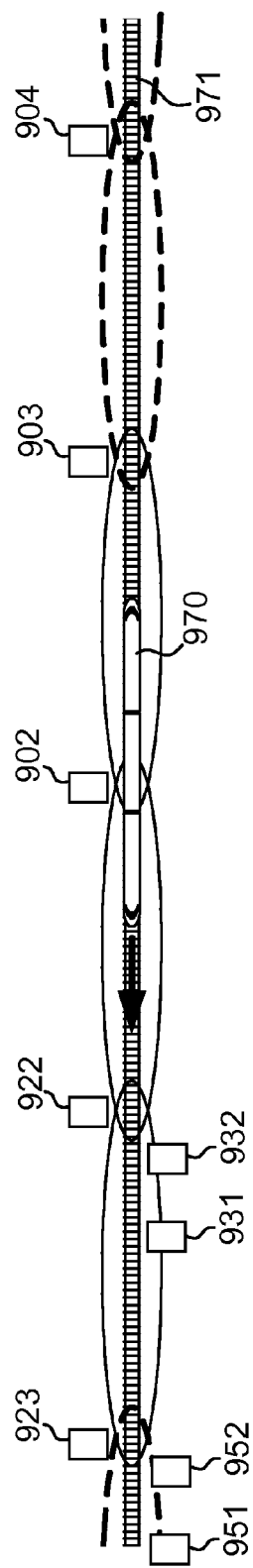
Fig. 9a
Fig. 9b

RADIO CELL ARRANGEMENT IN HIGH SPEED SCENARIO

TECHNICAL FIELD

Embodiments herein relate to a wireless communication system, and more specifically to controlling antenna nodes located along a path where a plurality of wireless communication devices are moving.

BACKGROUND

Wireless communication systems, i.e. systems that provide communication services to wireless communication devices such as mobile phones, smartphones etc. (often denoted by UE that is short for user equipment), have evolved during the last decade into systems that must utilize the radio spectrum in the most efficient manner possible. A reason for this is the ever increasing demand for high speed data communication capabilities in terms of, e.g., bitrate and to provide these capabilities at any given time, at any geographical location and also in scenarios where the wireless communication device is moving at a high speed, e.g., on board a high speed train.

To meet this demand, within the third generation partnership project, 3GPP, work is being done regarding possible enhancements to radio resource management, RRM, performance in high speed train environments. The justification is that there are railways such as Japan Tohoku Shinkansen (running at 320 km/h), German ICE (330 km/h), AGV Italo (400 km/h), and Shanghai Maglev (430 km/h) which vehicles travel at greater than 300 km/h and where there is demand for using mobile services. In a motivation contribution to 3GPP RAN#66, RP-141849, four scenarios of interest to wireless communication network operators are disclosed. In a number of these scenarios, there is a dedicated network to provide railway coverage of the cellular system; either as a standalone network, or used in conjunction with a public network which is not specifically designed to provide high speed train coverage. The four scenarios in RP-141849 can be summarized as follows:

Scenario 1: A dedicated network is deployed along the railways (such as antenna nodes in the form of remote radio head, RRH, deployments). Separate carriers are utilized for dedicated and public networks. By sharing the same Cell identity among multiple RRHs, handover success rate can be increased to some extent.

Scenario 2: Separate carriers are utilized for high speed scenario. One carrier with good coverage serves as a primary cell, PCell, for mobility management. One carrier at high frequency may provide the good data transmission. Carrier aggregation, CA, or dual connectivity, DC, could be applied.

Scenario 3: A public network is deployed along the railways and repeaters are installed in train carriages. With repeaters, the signal quality can be improved although the penetration loss is large.

Scenario 4: A dedicated network is deployed along the railways and repeaters are installed in carriages.

Current standard specifications have partly taken UE speeds up to 300 km/h into account, but only in the context of data demodulation, not for cell detection. With increased deployment of high speed train lines, increased number of UE users, and increased usage of bandwidth per user, dominating network operators are requesting improved UE performance and support for speeds exceeding 300 km/h. Future high speed trains are expected to travel at speeds above 500 km/h, e.g. the Superconducting Magnetic Levitation train (SCMaglev) to be deployed in Japan, where train sets have already reached 580 km/h in speed tests.

Apart from the relatively shortened time for detecting suitable neighbor cells for handover or cell reselection, high speed movement of the UE may also lead to significant Doppler shifts of the received radio signals. Such a Doppler shift forces the UE to increase its demodulation frequency when moving towards a cell (i.e. moving towards an antenna that defines a radio lobe of the cell), and decrease demodulation frequency when moving away from a cell, in order to maintain an acceptable receiver performance.

The Doppler shift can be expressed as:

$$\Delta f = f \left( \sqrt{\frac{1 - \frac{v}{c}}{1 + \frac{v}{c}}} - 1 \right)$$

where c is the speed of light and v is the relative velocity of the UE towards the transmitting antenna. Referring to FIG. 1, an UE 101 is on a high speed train 103 on a railway track 104, connected to and moving away from cell A2 105 and quickly needs to detect cell B1 107 towards which the UE 101 is moving with a velocity $v_{UE}$ 109 of the train. According to current standard an antenna 111, 113 of a cell site can be as close as 2 m from the railway track 104, mainly motivated by that the wireless communication network would be integrated with the high-speed railway infrastructure. With an angle α between railway track 104 and a direction 106 to a cell antenna 113 and a UE velocity $v_{UE}$, the relative velocity v towards the transmitting antenna giving rise to Doppler shift is $v = v_{UE} \cos \alpha$.

The magnitude of the Doppler shift depends on the relative velocity of the UE 101 towards the transmitting antenna in a cell. Consequently, with transceivers located close to a path along which an UE is moving, i.e., a small angle between the trajectory of the UE and the line between the UE and the transmitting antenna, a substantial part of the UE velocity will transfer into a Doppler shift. Moreover there will be an abrupt change of sign of the Doppler shift when the UE passes the transmitting antenna and the smaller the angle, the more abrupt is the change from positive to negative Doppler shift.

Each radio propagation path may have its own Doppler shift, depending on how the radio waves travel between the transmitting antenna and the UE. In case of line-of-sight there is one dominant path, whereas in e.g. urban areas there is generally scatter (reflections) due to buildings to which the UE has a relative velocity, giving rise to multiple paths for the signal to propagate to the UE, each with a different Doppler shift. Since the received signal (in general) is the superposition of those paths, it gives rise to Doppler spread which degrades radio receiver performance by smearing out the signal in the frequency domain hence causing inter-carrier interference.

High-speed railway track sections are generally using dedicated platforms often elevated above the landscape or city beneath. Hence, there are few objects that can cause a significant Doppler spread; with cell sites located along the track line-of-sight will be dominating at least between the cell site and the train. Moreover, in built-up areas as well as when a train is approaching or passing stations the speed is generally restricted of concern for public safety and disturbing noise, and as a consequence the Doppler shift becomes small.

With regard to handover of a UE from a source cell to a target cell or, in scenarios where carrier aggregation is used, handover to a new primary cell, PCell, configuration of a new secondary cell, SCell, and configuration and activation of a new primary secondary cell, PSCell, is usually based on measurement reports from the UE, where the UE has been configured by the network node to send measurement reports periodically, at particular events, or a combination thereof. Such measurement reports typically contain physical cell identity, reference signal strength, RSRP, and reference signal quality, RSRQ, of the detected cells. Handovers can also be blind (i.e. no measurements performed on target carrier and/or cell) based on the network node having knowledge about coverage on other carriers and location of the UE. An example of this can be found in U.S. Pat. No. 8,892,103 entitled "Methods and nodes supporting cell change".

The latency at a handover to a known (measured) PCell counted from reception of the handover command at the UE antenna until the UE carries out contention-free random access towards the target cell, can be up to 65 ms comprising 15 ms RRC procedure delay, 20 ms preparation time for the UE, and up to 30 ms latency for next physical random access channel, PRACH, occasion. One of the purposes with random access is to configure the UE with an appropriate timing advance value such that uplink transmissions by the UE are aligned with the subframe timing when received by the network node. Each random access attempt typically takes 20 ms hence in case the UE has to repeat the random access due to not getting response from the network node the time will be prolonged, but as a general figure one can assume 85 ms in total until the UE can resume communication in the target cell provided that the first attempt of random access is successful.

In the UE the preparation time is needed, e.g., for stopping processing and tearing down data structures and data memory associated with the source cell to release processing, memory and radio resources so they are available for the configuration to be used in the target cell. The reconfiguration may in general require re-partitioning of the data memories due to other bandwidth used in target cell, loading of new program code to support other transmission modes or radio access technology than in source cell.

However, there remain a number of challenges in relation to high-speed train scenarios in prior art. For example:
  The UE experiences high Doppler shifts when passing an antenna node at a cell site, particularly when the site is close to the railway as in scenarios 1, 2 and 4 in RP-141849 summarized above. Such shifts also occur when the UE is handed over from one cell to another if the UE is moving in opposite directions to the cells. The abrupt shifts means that the UE will have to retune its radio before it can receive and transmit again, which is further prolonging a handover.
  A UE that is between two antenna nodes, e.g. remote radio heads, in Scenarios 1, 2 and 4 in RP-141849 will receive the same signal from at least two directions, with opposite Doppler shifts. This gives rise to a Doppler spread also in the line-of-sight case, causing inter-carrier interference and degrades the receiver performance when both towers are received with about the same strength.
  The abrupt change of sign for the Doppler shifts causes the frequency offset (discrepancy between UE demodulation frequency and the perceived carrier frequency) to be so large that it falls outside the capture range of the estimators. The UE risks tuning towards the wrong target with severely impacted performance and/or radio link failure as result.
  Existing assumptions on network deployments for high-speed train scenarios assumes inter-cell distance of 300 m to 1000 m, which means that the UE changes or passes an antenna node at, e.g., a cell tower every 150 m to 500 m. This means that the UE will have to retune its receiver every 1.1 to 3.6 seconds when moving at a speed of 500 km/h. Each handover-related and/or Doppler-related interruption will have a significant impact on both system and UE throughputs.
  Downlink, DL, and/or uplink, UL, Coordinated multi-point, CoMP, operation techniques can be deployed in both homogeneous and heterogeneous networks (see e.g. 3GPP TR 36.819 v11.1.0). But with high Doppler shifts and abrupt change of sign for the Doppler shifts it's impossible to use DUUL CoMP techniques to enhance base station and/or UE performance as it requires good frequency (equal or less than 300 Hz) and time tracking between Quasi-collocated base stations from multiple points.

SUMMARY

In view of the above, an object of the present disclosure is to overcome or at least mitigate at least some of the drawbacks related to prior art in handling radio communication with wireless communication devices.

This is achieved in a first aspect by a method, performed by a network node in a network. The network node is connected to a plurality of antenna nodes that are located along a path where a plurality of wireless communication devices are moving. The method comprises:
  controlling the antenna nodes to maintain a respective radio cell, each cell having one and the same physical cell identity, and
  controlling the antenna nodes to maintain the respective radio cell in a single direction substantially along the path such that each wireless communication device, during movement in a movement direction along the path, can connect either to consecutive antenna nodes towards which the wireless communication device is moving or connect to consecutive antenna nodes away from which the wireless communication device is moving.

In other words, a plurality of cells are maintained and can be considered as a "super-cell" comprising two or more cells, where all cells within the super-cell share the same physical cell identity and configurations such that the UE can get handed over between cells seamlessly. Problems with radio link failures or long interruptions due to sudden steps in frequency offset (i.e. shifting sign of Doppler frequency) is addressed in that the antenna nodes in the cells are controlled in such manner that UEs always either receive all cells in the super-cell from the direction it is heading towards, or from the direction it is coming from.

The antenna nodes may, in some embodiments, be controlled to maintain one and the same downlink radio frame timing and to maintain one and the same timing offset between downlink and uplink. Alternatively, the antenna nodes may be controlled to maintain respective downlink radio frame timings that differ between consecutive antenna nodes by a respective timing value that is proportional to a size of respective cell maintained by the consecutive antenna nodes, and to maintain respective timing offsets between downlink and uplink that differ from each other by a respective timing offset value that is proportional to the size of respective cell maintained by the consecutive antenna nodes.

In other words, depending on cell sizes, the cells in the super-cell may be synchronized to have identical UL and DL frame timings (for example, as seen at a transmitting antenna connector), or to have systematically shifted frame timings to compensate for radio propagation delay experienced by the UE at the point where it enters the coverage of the next cell. An effect of such synchronization is hence that timing jumps are avoided that otherwise would generate inter-symbol interference in the UE and in the antenna node.

The antenna nodes may, in some embodiments, be controlled such that a first set of antenna nodes among the plurality of antenna nodes maintains communication with a first set of wireless communication devices among the plurality of wireless communication devices by utilizing a set of radio communication resources, and such that a second set of antenna nodes among the plurality of antenna nodes maintains communication with a second set of wireless communication devices among the plurality of wireless communication devices by utilizing said set of radio communication resources. Moreover, all radio cells maintained by the first set of antenna nodes are geographically separated from all radio cells maintained by the second set of antenna nodes.

In other words, in such embodiments, a super-cell may be split into sets (herein also denoted segments) comprising two or more cells where resources can be reused between segments provided that they are geographically separated. In case the several UEs are located onboard moving trains, such embodiments allow UEs of several trains to be served simultaneously, where the UEs on each train have the full cell capacity to share.

The antenna nodes may, in some embodiments, be controlled such that antenna nodes are deleted from and added to the first set of the antenna nodes in dependence of a movement of the first set of wireless communication devices along the path, and such that nodes are deleted from and added to the second set of the antenna nodes in dependence of a movement of the second set of wireless communication devices along the path.

In other words, resources in a super cell may in such embodiments be reused in that the segments follow the sets of wireless communication devices that are located onboard trains. This enables users of UEs on a train to share the full cell capacity as long as the segments are geographically non-overlapping.

In such embodiments, the movement of any of the first set of wireless communication devices and the second set of wireless communication devices along the path may be determined by any of:
  determining an uplink signal strength associated with consecutive antenna nodes,
  determining a Doppler shift of uplink signals,
  obtaining a signal measurement report from at least one wireless communication device,
  determining an accumulated timing advance, TA, value and a TA update rate associated with at least one wireless communication device,
  determining an uplink path loss, and
  obtaining information from an operator of vehicles that carries at least one wireless communication device along the path.

In some embodiments, wherein carrier aggregation is utilized, the antenna nodes may be controlled such that each consecutive antenna node away from which the wireless communication device is moving maintains one and the same primary cell.

In some embodiments, wherein carrier aggregation is utilized, the antenna nodes may be controlled such that each consecutive antenna node away from which the wireless communication device is moving maintains one and the same secondary cell. Alternatively, in some embodiments, the antenna nodes may be controlled such that each consecutive antenna node towards which the wireless communication device is moving maintains one and the same secondary cell.

In other words, embodiments where carrier aggregation is used, moving wireless communication devices onboard trains heading in different directions can use different carriers as primary component carrier, PCC, where each PCC is oriented such that the train enters coverage where the cell is strong, and leaves where it is weak, by which a legacy handover procedure can be used. With regard to SCC the activation and deactivation of cells is managed by the PCell, and hence it is not critical for the mobility function how the UE enters coverage of an SCell.

In general terms, the various embodiments herein provide advantages in terms of improved throughput; both system throughput and UE throughput by reducing the interruptions needed for frequency retuning and/or handover procedures when a UE is traveling at high speed, e.g. onboard a high-speed train. The embodiments herein makes CoMP techniques applicable under high speed scenarios which can enhance system performance from both base station and UE sides.

In a second aspect there is provided a network node configured to be connected to a plurality of antenna nodes that are located along a path where a plurality of wireless communication devices are moving. The network node comprises input/output circuitry, a processor and a memory. The memory contains instructions executable by the processor whereby the network node is operative to:
  control the antenna nodes to maintain a respective radio cell, each cell having one and the same physical cell identity, and
  control the antenna nodes to maintain the respective radio cell in a single direction substantially along the path such that each wireless communication device, during movement in a movement direction along the path, can connect either to consecutive antenna nodes towards which the wireless communication device is moving or connect to consecutive antenna nodes away from which the wireless communication device is moving.

In another aspect there is provided a computer program, comprising instructions which, when executed on at least one processor in a network node, cause the network node to carry out the method as summarized above in connection with the first aspect and the various embodiments of this aspect.

In another aspect there is provided a carrier comprising a computer program according to the summarized aspect above, wherein the carrier is one of an electronic signal, an optical signal, a radio signal and a computer readable storage medium.

These other aspects provide the same effects and advantages as summarized above in connection with the method of the first aspect.

BRIEF DESCRIPTION OF THE DRAWINGS

FIGS. 2a-c schematically illustrate Doppler shift associated with a moving UE,

DETAILED DESCRIPTION

Figure 1:
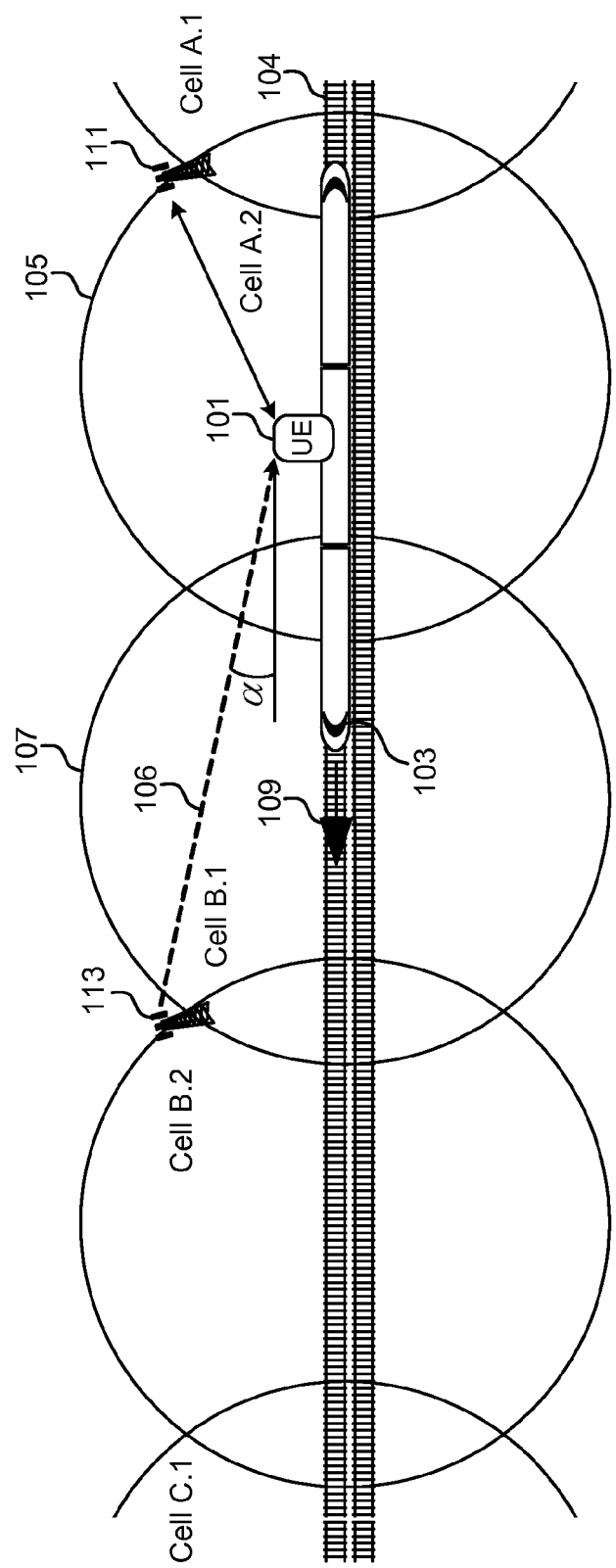
FIG. 1 schematically illustrates a UE on a high speed train.

FIGS. 2a-c schematically illustrate abrupt Doppler shifts caused by a UE passing a cell tower or being handed over from one cell tower to another. In FIG. 2a an east moving UE 201 is onboard an east moving train 202 on a railway track 231 and an west moving UE 203 is onboard an west moving train 204 on a railway track 232. Antenna node (or cell tower as will be used in the following) 210 maintains respective cells 211, 212, 213, 214 and antenna node 220 maintains cells 221, 222, 223, 224. In FIG. 2a the cells 211-214, 221-224 are exemplified by primary and secondary cells, PCC, SCC in a CA scenario, as indicated by the legend in FIG. 2a.

Two main problems arise when the UE is unaware of being handed over between cell towers, and which may lead to radio link failure:

Doppler shifts due to passing a cell tower 210, 220 or leaving the coverage of a first tower and entering coverage of a second, where the UE travels away from the first tower and towards the second tower, or vice versa, as illustrated by a handover zone 214 in FIG. 2a.

Doppler spread in otherwise line-of-sight conditions (between tower and vehicle within which the UE resides) due to simultaneous reception from a first and a second cell tower, where the UE travels away from the first tower and towards the second tower, or vice versa.

In case the UE passes a cell tower that is close to the railway tracks the change of sign for the Doppler shift will be abrupt and come without any telltale sign.

FIGS. 2b and 2c illustrate the abrupt Doppler shift $+/-\Delta f_{max}$ experienced by westbound and eastbound UEs, respectively. In FIG. 2b, at point 241, corresponding to antenna node 210 in FIG. 2a, the westbound UEs experience a Doppler shift from $\Delta f_{max}$ to $-\Delta f_{max}$. At point 242, corresponding to the handover zone 214, the westbound UEs experience a Doppler shift $-\Delta f_{max}$ to $\Delta f_{max}$, and at point 243, corresponding to antenna node 220, the westbound UEs experience a Doppler shift $\Delta f_{max}$ to $-f_{max}$. Conversely, for eastbound UEs, FIG. 2c illustrates how the Doppler shift changes at points 251, 252 and 253 that correspond to the antenna nodes 210, 220 and the handover zone 214.

It is most likely that future high-speed railway tracks using elevated platforms will have a minimum distance between railway tracks and cell tower (antenna node) that is very small in order to avoid having to lease additional sites along the tracks and instead use the existing platform or the land immediately next to it. Hence also for high speed train scenarios with velocities exceeding 500 km/h one can expect antennas to be close to the tracks, therefore causing abrupt shifts in frequency (i.e. $\Delta f_{max}$) in the order of several kHz.

One complication with the abrupt frequency shift is that the capture range for frequency offset estimation is in the order of ±2 kHz when using cell-specific reference signals (see for instance U.S. Pat. No. 8,675,788 "Correction of frequency offsets greater than the Nyquist frequency"). Beyond that range the estimate will be ambiguous which will increase the risk of the UE tuning towards an incorrect target and eventually causing a radio link failure. In a frequency division duplex, FDD, LTE scenario the capture range if using synchronization signals is ±7 kHz (for time division duplex, TDD, same as when using cell-specific reference signals) but the synchronization signals in general comprise fewer resource elements and occur more sparsely than cell-specific reference signals. Hence it is challenging for the UE to quickly detect and retune to large frequency steps; it will result in an impaired radio operation or interruption of duration of multiple radio frames or result in radio link failure.

Figure 3:
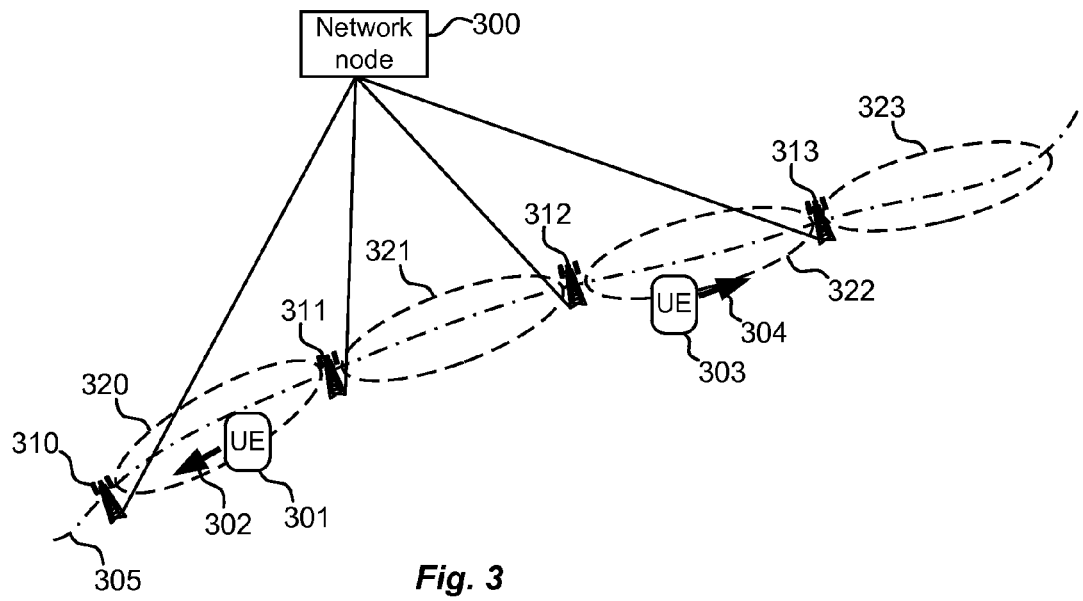
FIG. 3 schematically illustrates a network node connected to a plurality of antenna nodes.
Figure 4:
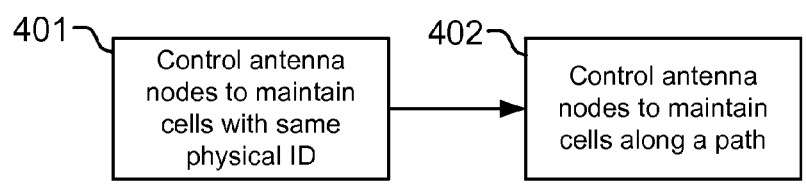
FIG. 4 is a flowchart of a method in a network node, FIGS. 5a-c schematically illustrate Doppler shift associated with a moving UE, FIG. 6 schematically illustrates antenna nodes and cells, FIG. 7 schematically illustrates radio propagation times, FIG. 8 schematically illustrates radio frame timing, FIGS. 9a-b schematically illustrate segments comprising a respective plurality of cells, FIG. 10 schematically illustrates a wireless communication system, FIG. 11 schematically illustrates functional blocks in a node and in antenna nodes.

Turning now to FIG. 3 and FIG. 4, embodiments of a method in a network node will be described in some detail.

It is to be noted that, in the present disclosure, generic terms in the form of "network node" and "UE" are used. However, non-limiting examples of network nodes include: antenna node, Node B, enhanced NodeB, e-NodeB, radio network controller, RNC, base station, base station controller, BSC, access point, base transceiver station, BTS, remote radio head, RRH, remote radio unit, RRU, relay, core network node etc. Similarly, UE may be any type of wireless device capable of communicating with a network node and/or with another wireless device over a wireless link. Non-limiting examples of UE are mobile terminal, laptop, USB device, embedded device, machine type communication, MTC, or machine-to-machine, M2M, capable, device-to-device, D2D, capable UE aka proximity service, ProSe, UE etc.

The method is performed by a network node 300 in a network, where the network node 300 is connected to a plurality of antenna nodes 310, 311, 312, 313 that are located along a path 305 where a plurality of wireless communication devices 301, 303 are moving. The method comprises, in an action 401, controlling the antenna nodes 310, 311, 312, 313 to maintain a respective radio cell 320, 321, 322, 323, each cell 320, 321, 322, 323 having one and the same physical cell identity. Further, the antenna nodes are in an action 402 controlled to maintain the respective radio cell 320, 321, 322, 323 in a single direction substantially along the path 305 such that each wireless communication device 301, 303, during movement in a movement direction 302, 304 along the path 305, can connect either to consecutive antenna nodes towards which the wireless communication device 301, 303 is moving or connect to consecutive antenna nodes away from which the wireless communication device 301, 303 is moving.

As mentioned above, in such a method a plurality of cells 320, 321, 322, 323 are maintained and can be considered as a "super-cell", where all cells within the super-cell share the same physical cell identity and configurations such that the UE 301, 303 can get handed over between the cells seamlessly.

Figure 5A:
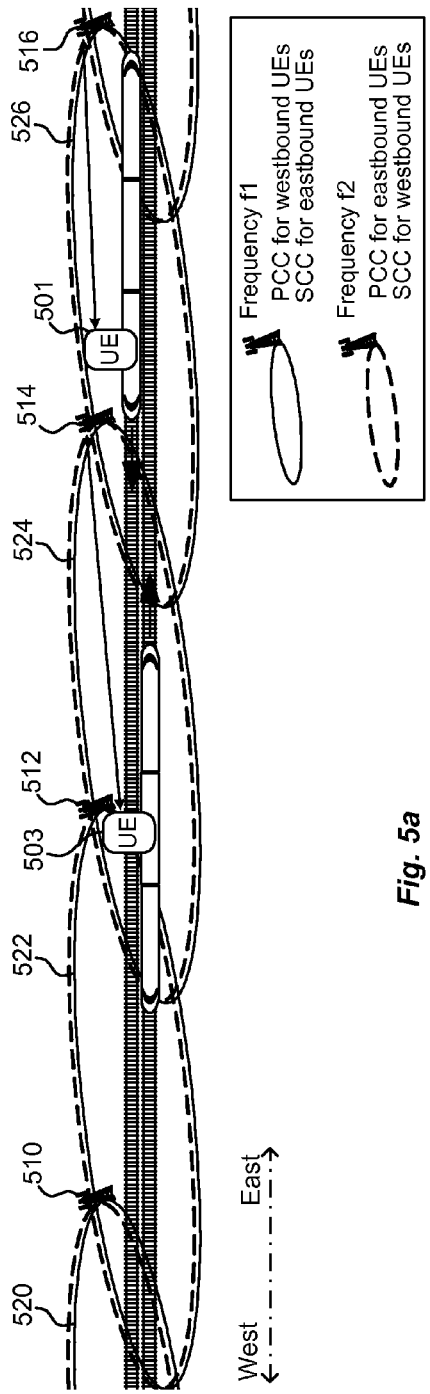
Figure 5B:
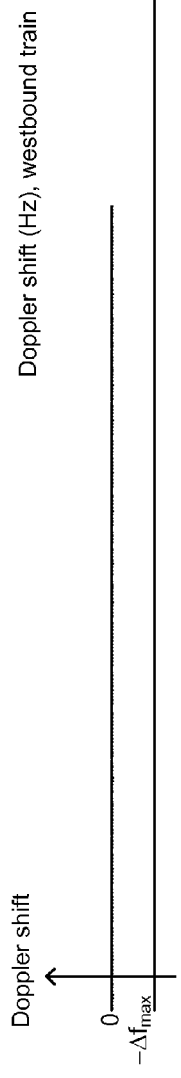
Figure 5C:
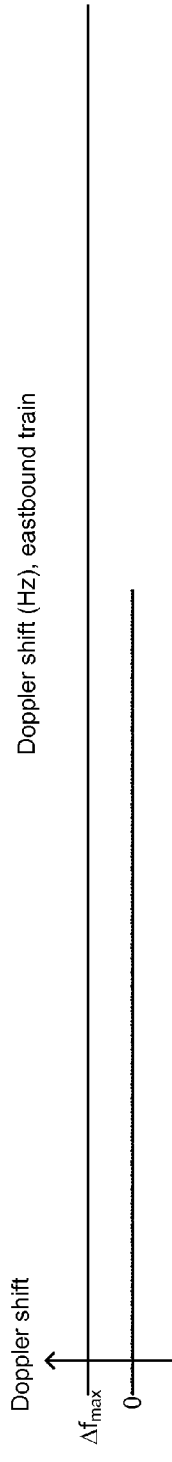

This is further illustrated in FIGS. 5a-c. In order to avoid UE 501, 503 interruptions due to frequency retuning, cells 520, 522, 524, 526 that form a super-cell use an antenna node 510, 512, 514, 516 configuration where a UE 501, 503 always moves either towards or away from the antenna node 510, 512, 514, 516 with which it communicates. This means the UE 501, 503 will always experience either a positive or a negative Doppler shift, by which passing an antenna node 510, 512, 514, 516 will only mean that a new path with essentially the same Doppler shift is becoming stronger. This is illustrated in FIG. 5*b* for the westbound UE 501 and in FIG. 5*c* for the eastbound UE 503. As is evident from FIG. 5*a*, this illustration is made in a CA context where each antenna node 510, 512, 514, 516 maintains a respective PCC as indicated with a solid line for respective cell 520, 522, 524, 526 and maintains a respective SCC as indicated with a dashed line for respective cell 520, 522, 524, 526.

Figure 6:
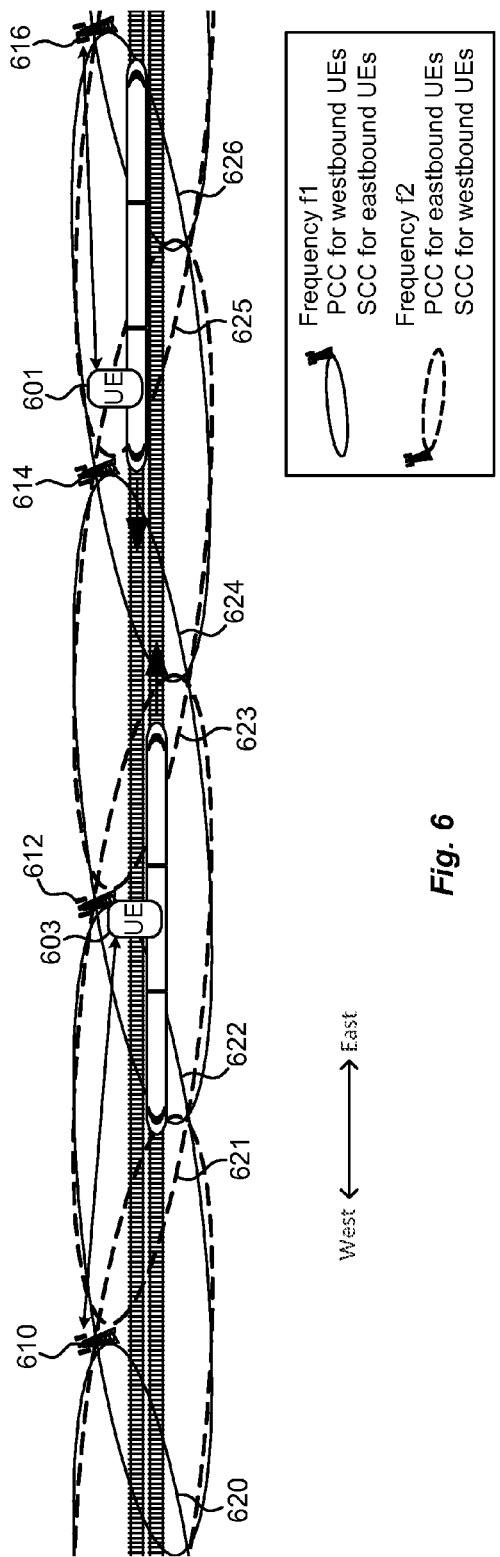

A variation of controlling antenna nodes is illustrated in FIG. 6, where a UE 601, 603 traveling in either direction (west and east, respectively) experiences a PCC with a negative Doppler shift and a SCC with a positive Doppler shift. PCCs for the westbound UE 601 and SCCs for the eastbound UE 603 are illustrated with solid lines 620, 622, 624 and 626. PCCs for the eastbound UE 603 and SCCs for the westbound UE 601 are illustrated with dashed lines 621, 623 and 625.

The benefit of this arrangement is that the UE 601, 603 will be handed over from a weak cell to a strong cell and hence not requiring new events for handovers at borders of super cells.

The SCell coverage differs from the PCell coverage, hence the network node has to rely on SCell measurements before reconfiguring a SCell unless applying the principles outlined in PCT/EP2014/071423 for SCell preconfiguration and autonomous SCell activation. Another drawback is that the frequency offset will differ considerably between PCC and SCC, and although constant the UE might have to be aware of the possibility for this scenario in order to handle it correctly with respect to AFC.

Returning to FIG. 4, controlling the antenna nodes in action 401, may in some embodiments comprise controlling the antenna nodes 310, 311, 312, 313 to maintain one and the same downlink radio frame timing and to maintain one and the same timing offset between downlink and uplink.

Alternatively, controlling the antenna nodes in action 401, may in some embodiments comprise controlling the antenna nodes 310, 311, 312, 313 to maintain respective downlink radio frame timings that differ between consecutive antenna nodes by a respective timing value that is proportional to a size of respective cell maintained by the consecutive antenna nodes, and to maintain respective timing offsets between downlink and uplink that differ from each other by a respective timing offset value that is proportional to the size of respective cell maintained by the consecutive antenna nodes.

Figure 7:
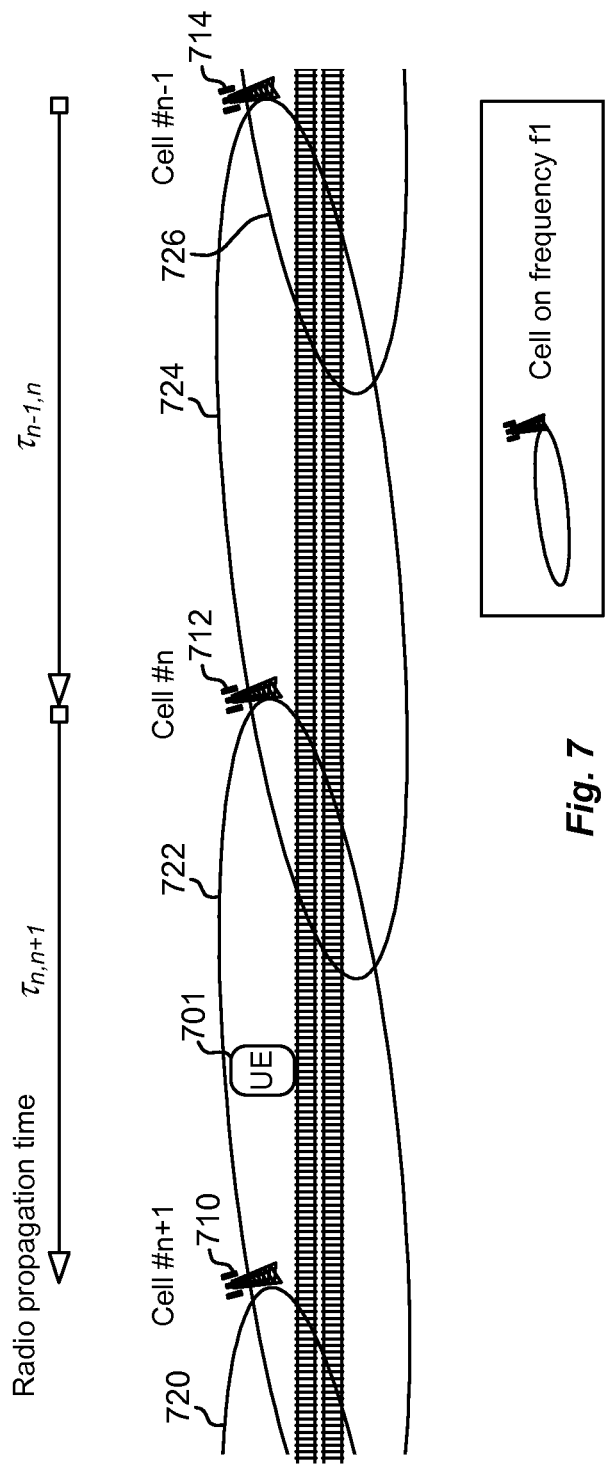
Figure 8:
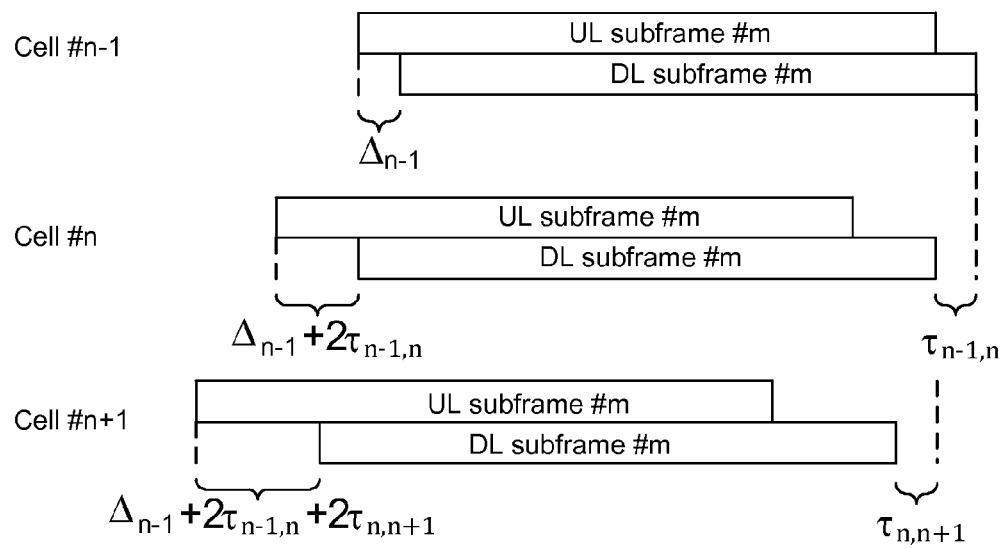

Such embodiments are illustrated with reference to FIG. 7 and FIG. 8. For small inter-site distance (i.e. distances between antenna nodes 710, 712, 714) with respect to the radio propagation delay all cells 720, 722, 724, 726 in the super-cell may operate synchronously and have identical frame timing and UL-DL offset. In general a network node in the form of a base station (e.g. an eNodeB), can handle UE 701 transmissions that are time misaligned by ±1-2 µs, but if the misalignment becomes larger inter-symbol interference may arise and will degrade the performance. Similarly, cell tracking and demodulation performance on the UE 701 side are also impaired by inter-symbol interference if there is too large discrepancy between the assumed symbol timing and the actual timing of the dominating path, particularly if there is a sudden change that is larger than half the cyclic prefix (normal cyclic prefix is 4.7 µs). It is therefore desirable to secure that when the UE unknowingly is handed over between cells inside the super-cell, the timing does not jump more than can be tolerated by the network node (e.g. eNodeB), antenna node or the UE 701 without performance degradation.

The cell timing perceived by the UE 701 before changing from one cell to another in the super-cell is depending on the radio propagation time from the current tower at the point where the UE 701 goes into coverage of the next tower. When the UE 701 enters coverage of cell #n 722 it is desirable that the difference in perceived timing for cells #n−1 724 and #n 722 is within the tolerable margin, say 1 µs on downlink (where the exact value may depend on the network node, antenna node or eNodeB implementation).

For cells with a range of up to 300 m it is possible to operate synchronously with the same frame timing at the antenna node (e.g. eNodeB) transmit, Tx, antenna connector since the propagation delay over 300 m is and in worst case in case a 2 µs misalignment will be seen on the UL in case the UE transmits based on the timing in the previous cell.

For cells larger than 300 m, in order for the DL cell timings in the UE 701 to be within the acceptable margin at the handover occasions, it is necessary to operate the cells in a phased manner with respect to frame timing at the antenna node (e.g. eNodeB) Tx antenna connector. Thereby the perceived DL timing of the next cell falls within the acceptable margin, and the UE transmits within the acceptable time window. One example of how this can be achieved is illustrated in FIG. 8, where the DL timing as well as the UL-DL offset is systematically increased between cells in order to give the impression to the UE that it is moving further and further out from the center of the super-cell.

As pointed out for small cells, it is enough to secure that the timing in the new cell falls within the acceptable margin hence the cells can be shifted by a little less than the propagation delay. For instance, as a non-limiting example the DL timing and UL-DL timing offsets between cell #n and cell #0 may be determined from:

$$\Delta_{n,0}^{DL}=\Sigma_{k=1}^{n}(\tau_{k-1,k}-\delta_k^{DL}), \text{ and}$$

$$\Delta_{n,0}^{UL-DL}=\Sigma_{k=1}^{n}(2\tau_{k-1,k}-\delta_k^{UL}),$$

where $\tau_{k-1,k}$ is the propagation delay between cells #k−1 and #k, and $\delta_k^{DL}$ and $\delta_k^{UL}$ are constants chosen such that $\tau_{k-1,k}-\delta_k^{DL}$ and $2\tau_{k-1,k}-\delta_k^{UL}$ are within the tolerable margin for downlink and uplink timing, respectively. FIG. 8 illustrates a special case where $\delta_k^{DL}$ and $\delta_k^{UL}$ both are zero.

Returning to FIG. 4, controlling the antenna nodes in action 401, may in some embodiments comprise controlling the antenna nodes such that a first set of antenna nodes among the plurality of antenna nodes maintains communication with a first set of wireless communication devices among the plurality of wireless communication devices by utilizing a set of radio communication resources, and such that a second set of antenna nodes among the plurality of antenna nodes maintains communication with a second set of wireless communication devices among the plurality of wireless communication devices by utilizing said set of radio communication resources, and wherein all radio cells maintained by the first set of antenna nodes are geographically separated from all radio cells maintained by the second set of antenna nodes.

The radio communication resources may be resource blocks, RB, in a LTE or eLTE scenario.

This is illustrated in FIG. 9*a*, where the first set comprises cells 910, 912, 914 that are maintained by antenna nodes 902, 903 and 904, respectively. The cells 910, 912, 914 of the first set of antenna nodes 902, 903 and 904 are illustrated with solid lines. The second set comprises cells 920, 922 that are maintained by antenna nodes 922 and 923, respectively. The cells 920 and 922 of the second set of antenna nodes 922 and 923 are illustrated with dashed lines. The first set of wireless communication devices is illustrated by UEs 931 and 932 and the second set of wireless communication devices is illustrated by UEs 951 and 952. As will be discussed further below, the cells maintained by respective sets of antenna nodes may be denoted segments. A train 970 on board which the UEs 931, 932, 951 and 952 may be located is shown moving along a path/track 971.

As illustrated in FIG. 9b, in some embodiments the action 401 comprises controlling the antenna nodes such that antenna nodes are deleted from and added to the first set of the antenna nodes in dependence of a movement of the first set of wireless communication devices 931, 932 along the path, and such that nodes are deleted from and added to the second set of the antenna nodes in dependence of a movement of the second set of wireless communication devices 951, 952 along the path. This is illustrated in FIG. 9b in that the first set of antenna nodes has changed from comprising antenna nodes 902, 903 and 904 to comprise antenna nodes 902, 903 and 922.

In other words, a network node controlling the antenna nodes that maintain the cells of a super-cell may divide the antenna nodes/cells into multiple segments with individual resource allocation when geographically separated. For instance, UEs on trailing trains or trains travelling in the opposite direction along a path/track may reuse the same allocations in the super-cell provided that they are in different, non-overlapping segments. In case a second, trailing train overtakes a first train, or a second train meets a first train, all UEs in the concerned segment have to share resources.

As exemplified in FIG. 9b, the segments may move along with the active UEs that are moving while on board each respective train, and comprise at minimum two cells; one for the current UE location, and one for where the UE will enter next. The number of cells in a segment may depend for instance on cell sizes, train set lengths, velocity and the maximum delay of the UL reporting from the UE to the network node or antenna node (e.g. eNodeB), since the network node needs to be able to track the UE or at least verify that it still belongs to the segment.

All cells within the segment transmit the same information to each associated UE, thereby allowing a UE to cross the cell boundary at a point in time not precisely known by the network node to continue the communication. Once the UE enters a cell, the network node activates the next cell and transmits identical information in that cell.

Returning to FIG. 4, controlling the antenna nodes in action 401, may in some embodiments comprise determining the movement of any of the first set of wireless communication devices and the second set of wireless communication devices along the path by any of:
  determining an uplink signal strength associated with consecutive antenna nodes,
  determining a Doppler shift of uplink signals,
  obtaining a signal measurement report from at least one wireless communication device,
  determining an accumulated timing advance, TA, value and a TA update rate associated with at least one wireless communication device,
  determining an uplink path loss, and
  obtaining information from an operator of vehicles that carries at least one wireless communication device along the path.

In other words, a network node may associate a UE with other UEs displaying an identical trail (for example when the UEs are being used on one and the same train that is moving along a path/track), and may associate the group of UEs to a segment which it then manages, rather than tracking each UE separately. The associated UEs may have different level of connected mode activity, but at least some UEs are likely to be in full activity at any given moment of time, allowing the network node to determine whether to have the segment to slide into the next cell (as illustrated in FIG. 9b).

Means for the network node to determine how the UE is moving may for instance include any or a combination of the following (as indicated above):
  UE trail; how quickly did it pass previous cells as can be established by analyzing which cell receives the UL Tx the strongest.
  UL Rx Doppler; analyze the Doppler shift on UL to find UE velocity.
  Signal measurements; serving cell measurements and/or channel quality reporting allowing the network node to assess the position of the UE.
  Timing advance; accumulated timing advance and timing advance update rate.
  Uplink path loss, measured for example using sounding reference symbols.

Alternatively, a network operator that has control over the network node may receive information from a railway operator on the current location of the train (e.g. global positioning system, GPS, coordinates), associate a segment with the train, and associate UEs with the segment and thereby keeping track of which cells need to be active.

Should there be branching along the path/track along which the train/UEs are moving, the network node may for instance prepare neighbour cells for all possible outcomes, and then identify which path/track the group of UEs is following by which it can release resources for cells covering the other paths/tracks. Alternatively, at such branching points a regular (i.e. according to prior art) handover can be carried out by which the UE first identifies the best cell and then gets handed over. Yet another alternative is that the network operator receives information from the railway operator regarding the route the train will take.

Figure 10:
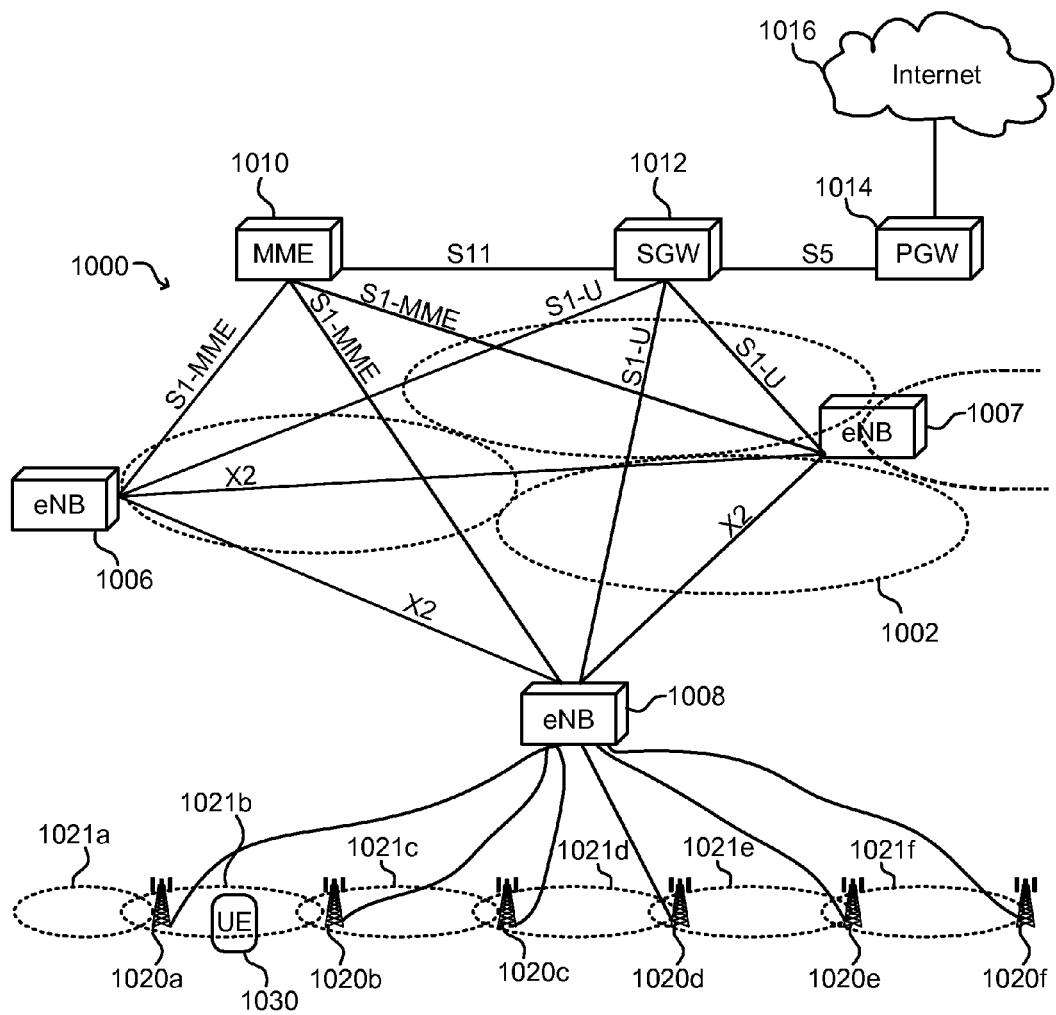

Turning now to FIG. 10, which illustrates parts of a 3GPP long term evolution, LTE, wireless network 1000. Base stations (enhanced NodeB, eNodeB or eNB) 1006, 1007, 1008 are communicating with each other over an X2 interface, and here e.g. exchange information on UEs to be handed over, and forwards user plane data packets from a source to a target cell. The base stations 1006, 1007 and 1008 are connected to a mobility management entity, MME, 1010, which keeps information about UEs (i.e. UE contexts) regarding capabilities etc., which the MME 1010 shares, e.g., with base stations connected to it. The MME 1010 is also managing handover of a UE from one MME to another when a UE leaves the pool of base stations managed by a source MME, or when the X2 connection is missing between the source and target base stations.

The base stations 1006, 1007 and 1008 are further connected to a serving gateway, SGW, 1012, which is handing the user data plane transport to and from the base station to which a UE is connected, and to one or more packet data network gateways, PGW, 1014, which connect UEs to the internet 1016. The MME in whose pool of base stations a UE resides configures which base station the SGW shall connect to for transport of the UE user plane data.

In FIG. 10, the base station 1008 is a network node as defined above and the base station/network node 1008 is connected to a number of antenna nodes 1020a-f. The base station/network node 1008 controls the antenna nodes 1020a-f as discussed herein and thereby maintaining respective cells 1021a-f. The cells 1021a-f may form a super-cell as described herein. A UE 1030 is illustrated, which may correspond to any UE described herein.

Management of a super-cell may be handled by a single network node such as an eNodeB (as indicated in FIG. 10) using antenna nodes in the form of remote radio heads, RRH, or remote radio units, RRU, for the individual cells 1021a-f. Management of a super-cell may in other embodiments be handled by a group of eNodeBs with or without RRHs or RRUs operating in a cooperative manner, or such group of eNodeBs under coordination of another network node, either a new entity or an existing one with extended functionality, e.g. an MME.

In case a super-cell is handled by multiple eNodeBs, data forwarding at handover of a UE between eNodeBs would heavily load the X2 interface since all UEs are to be handed over within the same time frame. To avoid excessive load the data packets are in such scenarios preferably routed by a SGW to both source and target eNodeBs.

Returning to FIG. 4, controlling the antenna nodes in action 401 may in some embodiments, where carrier aggregation is utilized, comprise controlling the antenna nodes such that each consecutive antenna node away from which the wireless communication device is moving maintains one and the same primary cell. Similarly, the control in action 401 may comprise controlling the antenna nodes such that each consecutive antenna node away from which the wireless communication device is moving maintains one and the same secondary cell. Similarly, the control in action 401 may comprise controlling the antenna nodes such that each consecutive antenna node towards which the wireless communication device is moving maintains one and the same secondary cell.

Moreover, one or more than one CoMP techniques such as Coordinated link adaptation, Dynamic point blanking, Coordinated Beamforming (null forming), Dynamic point selection, Joint transmission etc., can be combined with one or more than one of the above described methods. Some of the examples are as follows, although other combinations are not precluded:

One set of super-cells can be used for multiple points under CoMP where the multiple points can be deployed as cells next to each other along the railway (i.e. the path along which a train/UEs are moving). With simultaneous transmission and/or coordinated link adaptation for both DL and UL the system throughput can be improved on both UE and BS sides.

The antenna management as illustrated in FIGS. 5a-c and FIG. 6 can be combined with coordinated beamforming for different UEs where null forming from one UE can mitigate the interference for another UE in the meanwhile each UE can be operated well from multiple points with enhanced performance under high speed scenarios.

The radio resource management illustrated in FIGS. 9a and 9b can be combined with coordinated link adaptation which may further optimized the system performance between multiple points as one set of super-cells.

Figure 11:
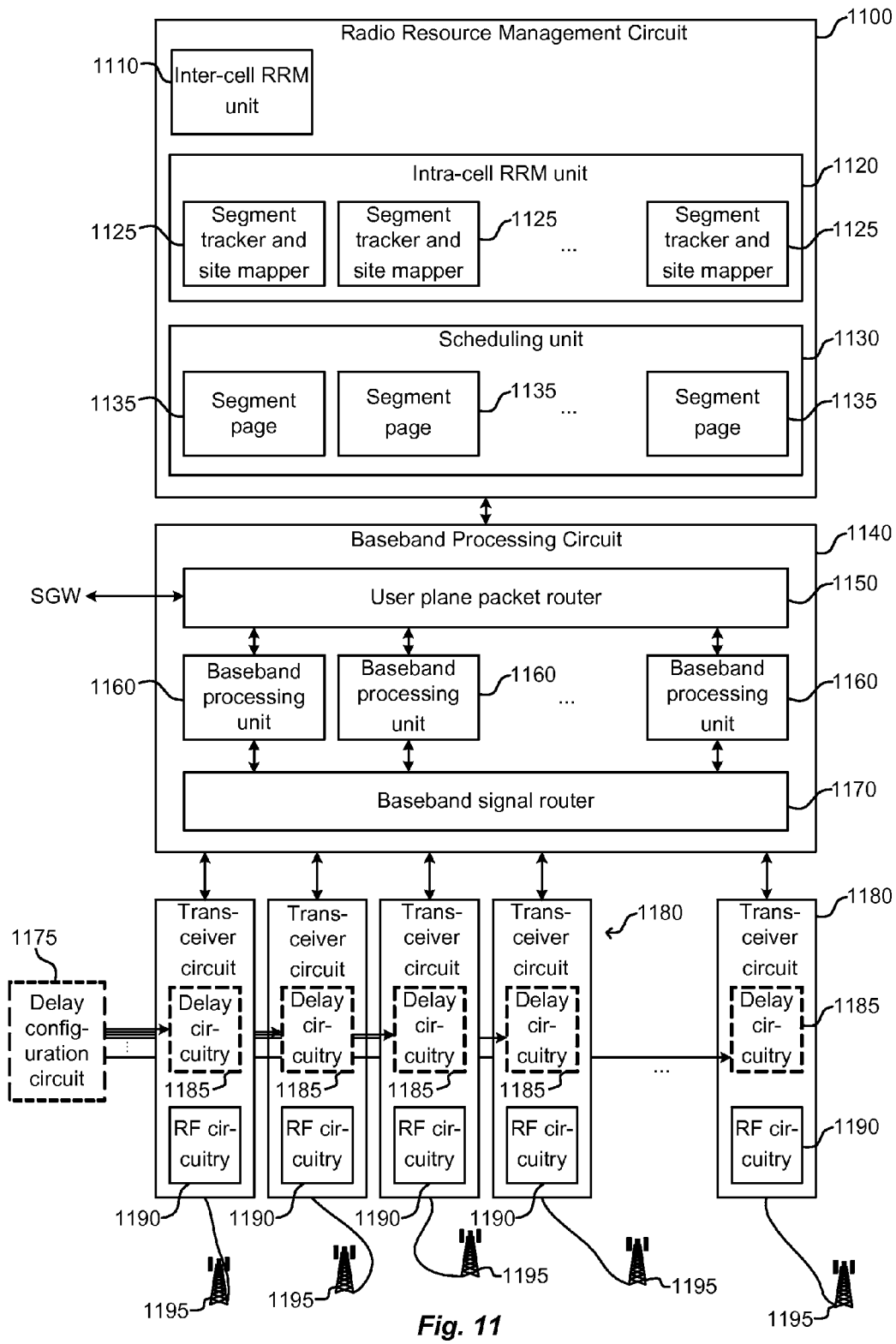

Turning now to FIG. 11, an example of arrangements in communicating nodes will be described in some more detail. The functional blocks of the arrangements that are illustrated in FIG. 11 may be comprised in a network node, a base station such as an eNodeB, a RRH, a RRU etc. as will be exemplified. The arrangements in FIG. 11 may be comprised in and/or correspond to any of the arrangements (nodes etc.) discussed above in connection with FIGS. 1 to 10.

Radio Resource Management, RRM, circuit 1100:

The RRM circuit 1100 may be deployed in an eNodeB and contains and inter-Cell RRM unit 1110, an Intra-Cell RRM unit 1120, and a Scheduling unit 1130.

The Inter-Cell RRM 1110 unit is handling handovers to cells outside the super-cell.

The Intra-Cell RRM 1120 unit is handling the mobility within the super-cell, including tracking and mapping of UEs into segments and mapping of segments to two or more physical sites 1125. Since the group of UEs is moving, the mapping of segment to physical sites is changing over time. The reason for mapping a segment to a minimum of two physical sites is that at some point the group of UEs will cross the border between sites and this crossing shall be seamless.

The Intra-Cell unit 1120 further keeps track of whether segments overlap each other, by which it provides information to the Scheduling unit 1130 so it can take into account that resources at the concerned physical sites are to be shared between UEs in two (or more) segments. Moreover, when a segment is approaching a super-cell border the Intra-Cell RRM unit 1120 is notifying the Inter-Cell RRM unit 1110 which then prepares handovers to neighbor cell(s).

Scheduling Unit 1130:

The scheduling unit 1130 contains information about one or more segments 1135 where information and allocations for UEs mapped to the each respective segment are stored. Each segment page can be viewed as a large registry or memory page. This is where the allocations and scheduling of individual UEs is handled. In prior art there would be one such page per cell and carrier.

Baseband Processing Circuit 1140:

The Baseband Processing circuit 1140 may be deployed in an eNodeB and comprises a User plane packet router 1150 which routs UE-specific packets from a Serving Gateway, SGW, to Baseband processing units 1160 assigned to the respective segment to which the UE belongs. There is one Baseband processing unit 1160 per segment, thus each baseband processing unit 1160 is serving two or more dynamically assigned physical sites (e.g. antenna sites/cell sites/antenna nodes). In prior art there would be one baseband processing unit per cell and carrier. Segments that are overlapping, fully or partially, are handled by a single Baseband Processing unit 1160.

The Baseband Processing circuit 1140 further contains a Baseband Signal Router 1170, which relays the baseband signals to and from RF circuits 1190 for each physical site, based on the segment-to-site mapping determined by the Intra-Cell RRM unit 1120.

Transceiver Circuit 1180:

There is one transceiver circuit 1180 per physical site (e.g. antenna site/cell site/antenna node), deployed in e.g. a RRU or RRH. The transceiver unit 1180 may contain Delay circuitry 1185, allowing the DL and UL timing to be shifted compared to the neighboring sites. Moreover the transceiver circuit contains a RF circuit 1190 that modulates baseband signals to radio frequency and vice versa.

Delay Configuration Circuit 1175:

There may be one Delay configuration circuit 1175, which is used for configuring the delays to be used by the Delay circuitry 1185 (if used). The Delay configuration circuit 1175 is typically located in the eNodeB.

Antennas Nodes 1195:

Each cell site is served by an Antenna node 1195, where all antenna nodes 1195 form lobes in the same direction along a path/track (as discussed above), with exception for one of the outermost antenna groups which may form lobes in both directions along the track.

The distance between antenna nodes 1195 and the signal power levels are tuned such that a first antenna node forms a lobe that is oriented in the same direction along the track as the lobe of a second adjacent antenna node, the second antenna node forms a lobe that is oriented in the same direction relative the tracks as the lobe of a third antenna node, and so on as discussed in detail above. Power levels are such that standardized side conditions for cell detection and demodulation are met regardless of where the UE is situated between any of the antenna nodes.

The first antenna node may in addition to having a lobe oriented in same direction along the tracks as a lobe of a second antenna node, also have a lobe that is oriented in the opposite direction along the tracks, bordering a neighbor cell.

Figure 12A:
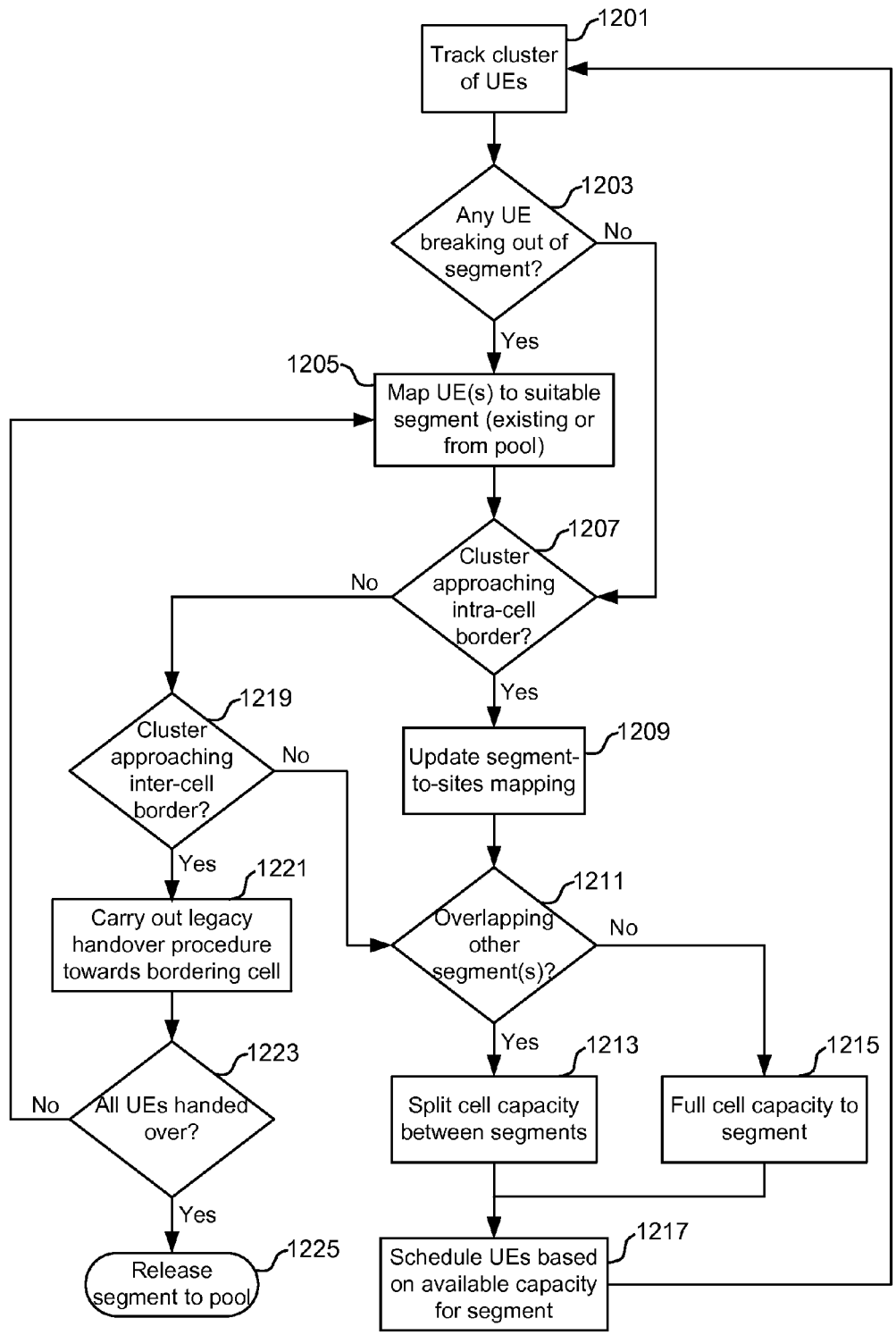
FIGS. 12a and 12b are flowcharts of a method, FIG. 13 schematically illustrates a network node, and FIG. 14 schematically illustrates a network node.

Turning now to FIG. 12a, an embodiment of a method performed by a network node will be described in some detail. The method may be realized in processing units by execution of software instructions that are located in circuits such as the different circuits illustrated in FIG. 11.

The method comprises a number of actions:

Action 1201:

The cluster of UEs associated with a segment is tracked by means of updating the information on where each UE is located—both in which cell and the approximate distance to the cell border, as deduced e.g. from applied timing advance, measured signal strength, and/or Doppler shift (indicative of velocity of UE towards or away from base station which together with time between Doppler detections can be used to determined relative change in distance).

Action 1203:

It is checked whether any of the UEs seem to part from the cluster, as determined from the updated information about the UE's position relative to the position of the cluster of UEs. This could for instance include comparing the change in UE position with the average change in position of the cluster of UEs.

Action 1205:

If a UE deviates from the cluster (1203; YES), it is evaluated whether the UE better belongs to another existing segment, or whether to create a new segment to associate with that UE. Should this step result in a consolidation of two (or more) clusters into one, the empty segments are deleted. For this flow it is assumed that the current segment is the one kept.

Action 1207:

It is checked whether the cluster is moving close to the border of a cell within the super cell, i.e., whether it is about to get into coverage of another site still belonging to the super cell and thus having the same physical layer cell identity and configuration.

Action 1209:

If it is found that the cluster is about to cross the border into another site still within the same super-cell (1207; YES) the segment is moved to include the new cell (site) in the direction the cluster of UEs is moving, and the trailing cell is released. The mapping of Segment-to-sites which essentially dictates which cells are to transmit information to the UEs in the concerned cluster is updated.

Action 1211:

It is checked whether any segments are overlapping each other, since that would imply that the cell capacity has to be split between UEs associated with the overlapping segments.

Action 1213:

In case one or more other segments are overlapping with the current segment (1211; YES) the cell capacity has to be shared between UEs associated with the overlapping segments. The available allocations for the current segment's page are updated to reflect this. Moreover the Segment-to-baseband processing unit mapping is configured to handle the communication with UEs belonging to the overlapping segments.

Action 1215:

In case the current segment is not overlapping any other segment (1211; NO) the whole cell capacity can be shared among the UEs associated with the current segment. The available allocations for the current segment's page are updated to reflect this. Moreover, in case the current segment was overlapping one or more other segments immediately before, the Segment-to-baseband processing unit mapping is updated to have one baseband processing unit serving the current segment only.

Action 1217:

The network node (e.g. base station) schedules the UEs associated with the current segment according to the available allocations (capacity) stated in the segment's page. This scheduling strategy continues until it is detected there are any changes in available capacity. The flow is repeated from action 1201.

Action 1219:

In case it is determined that the cluster of UEs associated with the current segment do not approach a cell border inside the super-cell (1207; NO), it is checked whether it is approaching the border of the super-cell. If not (1219; NO), the flow continues at action 1211.

Action 1221:

In case the cluster of UEs associated with the current segment is approaching the border of the super-cell (1219; YES), handover procedure for handover of the UEs to a bordering neighbor cell is initiated.

Action 1223:

After the handover procedure it is checked whether any UEs remain associated to segment. If so (1223; NO) the flow continues at action 1205.

Action 1225:

If all UEs have been handed over and no UEs are associated with the current segment (1223; YES), the current segment is deleted (memory cleared, mappings cleared, registers flushed and ready to be reused, etcetera).

Figure 12B:
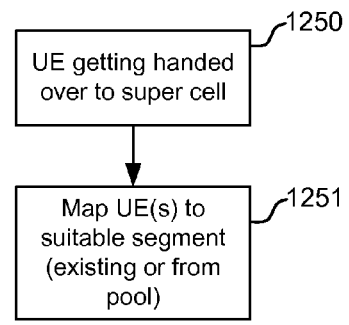

FIG. 12b illustrates an embodiment of a method performed by a network node in case a UE is being handed over from a neighbor cell to a super-cell. The method may be realized by execution in processing units of software instructions that are located in circuits such as the different circuits illustrated in FIG. 11.

The method comprises a number of actions:

Action 1250:

A UE is getting handed over from a neighbor cell to the super-cell. UE position at entrance to the super-cell is established and velocity of movement may be estimated e.g. from Doppler shift or be provided by the network node managing the neighboring cell.

Action 1251:

It is evaluated whether the newly handed over UE can be associated with an existing segment, or whether to create a new segment to host the UE.

Figure 13:
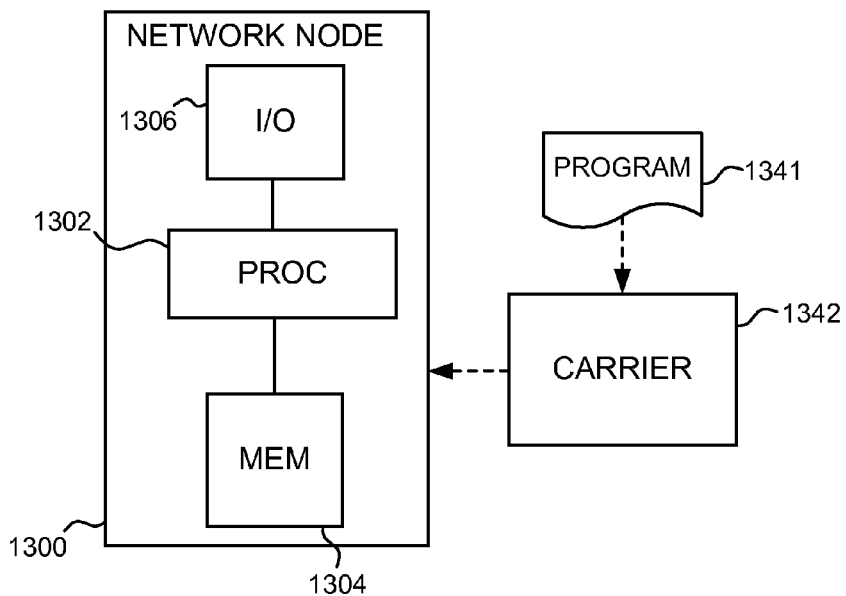
Figure 14:
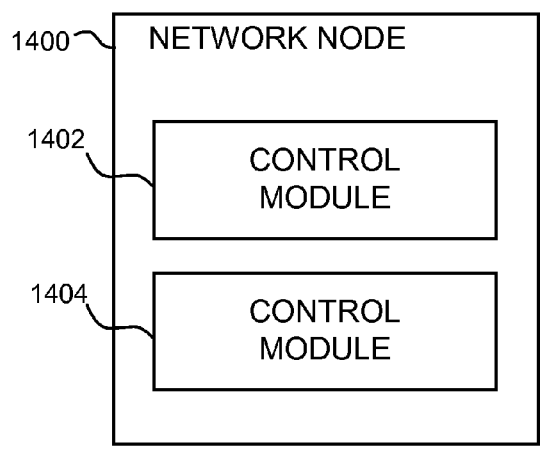

Turning now to FIGS. 13 to 14, further embodiments of a network node will be described in some more detail. FIG. 13 schematically illustrates a network node 1300 comprising input/output circuitry 1306, a processor 1302 and a memory 1304. The memory 1304 contains instructions executable by the processor 1302 whereby the network node 1300 is operative to:
- control the antenna nodes to maintain a respective radio cell, each cell having one and the same physical cell identity, and
- control the antenna nodes to maintain the respective radio cell in a single direction substantially along the path such that each wireless communication device, during movement in a movement direction along the path, can connect either to consecutive antenna nodes towards which the wireless communication device is moving or connect to consecutive antenna nodes away from which the wireless communication device is moving.

The instructions that are executable by the processor 1302 may be software in the form of a computer program 1341. The computer program 1341 may be contained in or by a carrier 1342, which may provide the computer program 1341 to the memory 1304 and processor 1302. The carrier 1342 may be in any suitable form including an electronic signal, an optical signal, a radio signal or a computer readable storage medium.

In some embodiments, the network node 1300 is operative to: p1 control the antenna nodes to maintain one and the same downlink radio frame timing and to maintain one and the same timing offset between downlink and uplink.

In some embodiments, the network node 1300 is operative to:
- control the antenna nodes to maintain respective downlink radio frame timings that differ between consecutive antenna nodes by a respective timing value that is proportional to a size of respective cell maintained by the consecutive antenna nodes, and to maintain respective timing offsets between downlink and uplink that differ from each other by a respective timing offset value that is proportional to the size of respective cell maintained by the consecutive antenna nodes.

In some embodiments, the network node 1300 is operative to:
- control the antenna nodes such that a first set of antenna nodes among the plurality of antenna nodes maintains communication with a first set of wireless communication devices among the plurality of wireless communication devices by utilizing a set of radio communication resources, and such that a second set of antenna nodes among the plurality of antenna nodes maintains communication with a second set of wireless communication devices among the plurality of wireless communication devices by utilizing said set of radio communication resources, and operative such that
- all radio cells maintained by the first set of antenna nodes are geographically separated from all radio cells maintained by the second set of antenna nodes.

In some embodiments, the network node 1300 is operative to:
- control the antenna nodes such that antenna nodes are deleted from and added to the first set of the antenna nodes in dependence of a movement of the first set of wireless communication devices along the path, and such that antenna nodes are deleted from and added to the second set of the antenna nodes in dependence of a movement of the second set of wireless communication devices along the path.

In some embodiments, the network node 1300 is operative to:
- determine the movement of any of the first set of wireless communication devices and the second set of wireless communication devices along the path by any of:
- determine an uplink signal strength associated with consecutive antenna nodes,
- determine a Doppler shift of uplink signals,
- obtain a signal measurement report from at least one wireless communication device,
- determine an accumulated timing advance, TA, value and a TA update rate associated with at least one wireless communication device,
- determine an uplink path loss, and
- obtain information from an operator of vehicles that carries at least one wireless communication device along the path.

In some embodiments, the network node 1300 is operative such that carrier aggregation is utilized, and operative to:
- control the antenna nodes such that each consecutive antenna node away from which the wireless communication device is moving maintains one and the same primary cell.

In some embodiments, the network node 1300 is operative such that carrier aggregation is utilized, and operative to:
- control the antenna nodes such that each consecutive antenna node away from which the wireless communication device is moving maintains one and the same secondary cell.

In some embodiments, the network node 1300 is operative such that carrier aggregation is utilized, and operative to:
- control the antenna nodes such that each consecutive antenna node towards which the wireless communication device is moving maintains one and the same secondary cell.

FIG. 14 illustrates schematically a network node 1400 that comprises:
- a control module 1402 configured to control the antenna nodes to maintain a respective radio cell, each cell having one and the same physical cell identity, and
- a control module 1404 configured to control the antenna nodes to maintain the respective radio cell in a single direction substantially along a path such that each wireless communication device, during movement in a movement direction along the path, can connect either to consecutive antenna nodes towards which the wireless communication device is moving or connect to consecutive antenna nodes away from which the wireless communication device is moving.

The node 1400 may comprise further modules that are configured to perform in a similar manner as, e.g., the node 1300 described above in connection with FIG. 13.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method performed by a network node in a network, where the network node is connected to a plurality of antenna nodes that are located along a predefined path where a plurality of wireless communication devices are moving, the method comprising:
forming a super-cell along the predefined path by:
controlling the antenna nodes to maintain a respective radio cell, each cell having one and the same physical cell identity; and
controlling the antenna nodes to maintain the respective radio cell in a single direction substantially along the predefined path such that each wireless communication device, during movement in a movement direction along the predefined path, can connect either to consecutive antenna nodes towards which the wireless communication device is moving or connect to consecutive antenna nodes away from which the wireless communication device is moving.

2. The method of claim 1, comprising:
controlling the antenna nodes to maintain one and the same downlink radio frame timing and to maintain one and the same timing offset between downlink and uplink.

3. The method of claim 1, comprising:
controlling the antenna nodes to maintain respective downlink radio frame timings that differ between consecutive antenna nodes by a respective timing value that is proportional to a size of respective cell maintained by the consecutive antenna nodes, and to maintain respective timing offsets between downlink and uplink that differ from each other by a respective timing offset value that is proportional to the size of respective cell maintained by the consecutive antenna nodes.

4. The method of claim 1, comprising:
controlling the antenna nodes such that a first set of antenna nodes among the plurality of antenna nodes maintains communication with a first set of wireless communication devices among the plurality of wireless communication devices by utilizing a set of radio communication resources, and such that a second set of antenna nodes among the plurality of antenna nodes maintains communication with a second set of wireless communication devices among the plurality of wireless communication devices by utilizing said set of radio communication resources,
wherein:
all radio cells maintained by the first set of antenna nodes are geographically separated from all radio cells maintained by the second set of antenna nodes.

5. The method of claim 4, comprising:
controlling the antenna nodes such that antenna nodes are deleted from and added to the first set of the antenna nodes in dependence of a movement of the first set of wireless communication devices along the predefined path, and such that nodes are deleted from and added to the second set of the antenna nodes in dependence of a movement of the second set of wireless communication devices along the predefined path.

6. The method of claim 5, comprising:
determining the movement of any of the first set of wireless communication devices and the second set of wireless communication devices along the predefined path by any of:
determining an uplink signal strength associated with consecutive antenna nodes;
determining a Doppler shift of uplink signals;
obtaining a signal measurement report from at least one wireless communication device;
determining an accumulated timing advance (TA) value and a TA update rate associated with at least one wireless communication device;
determining an uplink path loss; and
obtaining information from an operator of vehicles that carries at least one wireless communication device along the predefined path.

7. The method of claim 1, wherein carrier aggregation is utilized, comprising:
controlling the antenna nodes such that each consecutive antenna node away from which the wireless communication device is moving maintains one and the same primary cell.

8. The method of claim 1, wherein carrier aggregation is utilized, comprising:
controlling the antenna nodes such that each consecutive antenna node away from which the wireless communication device is moving maintains one and the same secondary cell.

9. The method of claim 1, wherein carrier aggregation is utilized, comprising:
controlling the antenna nodes such that each consecutive antenna node towards which the wireless communication device is moving maintains one and the same secondary cell.

10. A network node configured to be connected to a plurality of antenna nodes that are located along a predefined path where a plurality of wireless communication devices are moving, the network node comprising input/output circuitry, a processor and a memory, said memory containing instructions executable by said processor whereby said network node is operative to:
  form a super-cell along the predefined path by:
    controlling the antenna nodes to maintain a respective radio cell, each cell having one and the same physical cell identity; and
    controlling the antenna nodes to maintain the respective radio cell in a single direction substantially along the predefined path such that each wireless communication device, during movement in a movement direction along the predefined path, can connect either to consecutive antenna nodes towards which the wireless communication device is moving or connect to consecutive antenna nodes away from which the wireless communication device is moving.

11. The network node of claim 10, operative to:
control the antenna nodes to maintain one and the same downlink radio frame timing and to maintain one and the same timing offset between downlink and uplink.

12. The network node of claim 10, operative to:
control the antenna nodes to maintain respective downlink radio frame timings that differ between consecutive antenna nodes by a respective timing value that is proportional to a size of respective cell maintained by the consecutive antenna nodes, and to maintain respective timing offsets between downlink and uplink that differ from each other by a respective timing offset value that is proportional to the size of respective cell maintained by the consecutive antenna nodes.

13. The network node of claim 10, operative to:
control the antenna nodes such that a first set of antenna nodes among the plurality of antenna nodes maintains communication with a first set of wireless communication devices among the plurality of wireless communication devices by utilizing a set of radio communication resources, and such that a second set of antenna nodes among the plurality of antenna nodes maintains communication with a second set of wireless communication devices among the plurality of wireless communication devices by utilizing said set of radio communication resources,
wherein:
all radio cells maintained by the first set of antenna nodes are geographically separated from all radio cells maintained by the second set of antenna nodes.

14. The network node of claim 13, operative to:
control the antenna nodes such that antenna nodes are deleted from and added to the first set of the antenna nodes in dependence of a movement of the first set of wireless communication devices along the predefined path, and such that nodes are deleted from and added to the second set of the antenna nodes in dependence of a movement of the second set of wireless communication devices along the predefined path.

15. The network node of claim 14, operative to:
determine the movement of any of the first set of wireless communication devices and the second set of wireless communication devices along the predefined path by any of:
determine an uplink signal strength associated with consecutive antenna nodes;
determine a Doppler shift of uplink signals;
obtain a signal measurement report from at least one wireless communication device;
determine an accumulated timing advance (TA) value and a TA update rate associated with at least one wireless communication device;
determine an uplink path loss; and
obtain information from an operator of vehicles that carries at least one wireless communication device along the predefined path.

16. The network node of claim 10, where carrier aggregation is utilized, operative to:
control the antenna nodes such that each consecutive antenna node away from which the wireless communication device is moving maintains one and the same primary cell.

17. The network node of claim 10, where carrier aggregation is utilized, operative to:
control the antenna nodes such that each consecutive antenna node away from which the wireless communication device is moving maintains one and the same secondary cell.

18. The network node of claim 10, where carrier aggregation is utilized, operative to:
control the antenna nodes such that each consecutive antenna node towards which the wireless communication device is moving maintains one and the same secondary cell.

19. A nontransitory computer readable storage medium comprising instructions which, when executed on at least one processor in a network node in a network, cause the network node to carry out a method, wherein the network node is connected to a plurality of antenna nodes that are located along a predefined path where a plurality of wireless communication devices are moving, wherein the method comprises:
  forming a super-cell along the predefined path by:
    controlling the antenna nodes to maintain a respective radio cell, each cell having one and the same physical cell identity; and
    controlling the antenna nodes to maintain the respective radio cell in a single direction substantially along the predefined path such that each wireless communication device, during movement in a movement direction along the predefined path, can connect either to consecutive antenna nodes towards which the wireless communication device is moving or connect to consecutive antenna nodes away from which the wireless communication device is moving.

* * * * *